United States Patent [19]
Bernath

[11] Patent Number: 5,212,638
[45] Date of Patent: May 18, 1993

[54] ALPHABETIC KEYBOARD ARRANGEMENT FOR TYPING MANDARIN CHINESE PHONETIC DATA

[76] Inventor: Colman Bernath, 26-4, Sublane 342, Lane 150, Hsinyi Road, Taipei, Taiwan, 105

[21] Appl. No.: 606,987

[22] Filed: Oct. 31, 1990

Related U.S. Application Data

[60] Division of Ser. No. 357,499, May 26, 1989, which is a continuation of Ser. No. 551,555, Nov. 14, 1983, abandoned.

[51] Int. Cl.[5] ............................................. G06F 3/023
[52] U.S. Cl. ...................... 364/419; 341/28; 400/484; 400/486; 400/489; 381/44
[58] Field of Search .................. 341/28; 400/484, 486, 400/489; 364/419; 381/44

[56] References Cited

U.S. PATENT DOCUMENTS 3,945,482 3/1976 Einbinder ...................... 400/109 X
4,455,615 6/1984 Tanimoto et al. ................ 364/513.5

OTHER PUBLICATIONS

Olson DW and Jasinski L. E., "Keyboard Efficiency," Byte, Feb. 1986, pp. 241-244.

Primary Examiner—David L. Clark

[57] ABSTRACT

The invention is an alphabetic keyboard arrangement for convenient and fast typing—for instructional, research or data entry purposes—the phonetic data or phonetic transcriptions of Mandarin Chinese in the pinyin romanization. Its distinguishing features are the following: (1) the keys bearing the letters A, I, O and U are so placed that each is usually struck by a different finger; (2) the keys bearing the letters A, I, O, U, N and G, as these letters stand for the most frequently appearing syllabic final speech sounds, are placed in the row of keys on which the typist's fingers usually rest; (3) the keys bearing the letters A, E, I, U and H are so placed that each is usually struck by the index finger or middle finger of either hand; (4) the keys bearing the syllabic tone quality symbols are in the central are of the keyboard.

11 Claims, 7 Drawing Sheets

FIG. 2

(rows, read right-to-left as in figure)

Row 1: 地 看 ， 看 ， 看 。

Row 2 (18): 眼 件 例 得 ， 說 ， 了 的 。

Row 3 (20): 卻 不住 不 ， 的 。

Row 4 (22): 尤 其 的 到 子 高 的 。

Row 5: 由 的 ， 。

Row 6: 這 已經 是 第 了 這 的 。

FIG. 3

SELECTED CHINESE CHARACTERS AND THEIR PHONETIC AND MORPHEMIC DATA IN MANDARIN CHINESE

| Character Code[+] | Graphic Form | Meaning | Phonetic Spellings | | Speech Morpheme Code[+] |
|---|---|---|---|---|---|
| 0001 | 說 | to speak; to say | shuō or | ㄕㄨㄛ⁻ | 821 |
| 0002 | 條 | stripe; article, section | tiáo | ㄊㄧㄠˊ | 315 |
| 0003 | 例 | regulation; custom; example | lì | ㄌㄧˋ | 332 |
| 0004 | 法 | law; method | fǎ | ㄈㄚˇ | 175 |
| 0005 | 理 | reason; principle; to arrange | lǐ | ㄌㄧˇ | 331 |
| 0006 | 調 | to mix; to regulate | tiáo | ㄊㄧㄠˊ | 315 |
| 0007 | 有 | to have; etc. | yǒu | ㄧㄡˇ | 1138 |
| 0008 | 井 | a well; a system | jǐng | ㄐㄧㄥˇ | 511 |
| 0009 | 然 | —wise (a suffix or a connective) | rán | ㄖㄢˊ | 853 |
| 0010 | 台 | a platform; a stand; etc. | tái | ㄊㄞˊ | 274 |
| 0011 | 窪 | a pit, a hollow | wā | ㄨㄚ⁻ | 1252 |
| 0012 | 哇 | (the sound of crying) | wā | ㄨㄚ⁻ | 1252 |
| 0013 | 坑 | a pit, a hole | kēng | ㄎㄥ⁻ | 425 |
| 0014 | 叫 | to call, to emit sound | jiào | ㄐㄧㄠˋ | 490 |

[+]These are decimal number codes arbitrarily assigned, for the sake of illustration. Approximate ranges of the codes: character codes 1–10,000 and morpheme codes 1–1280.

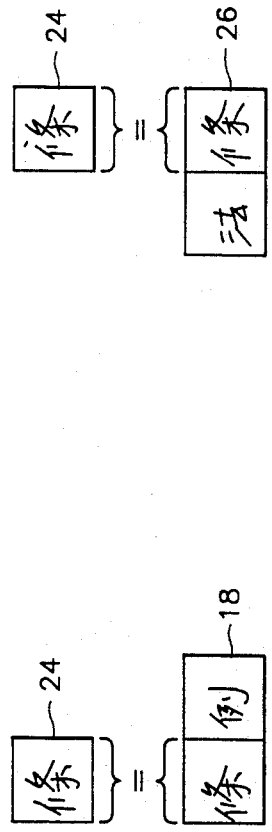
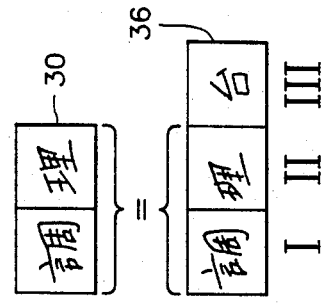
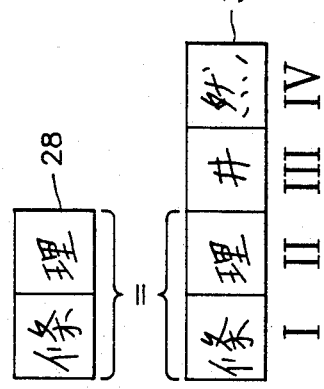
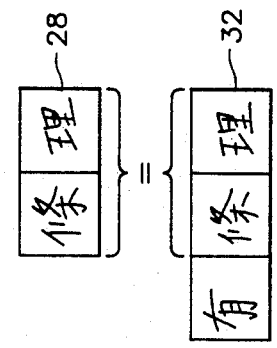
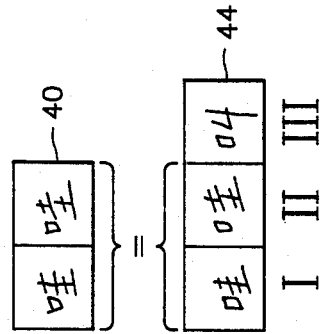
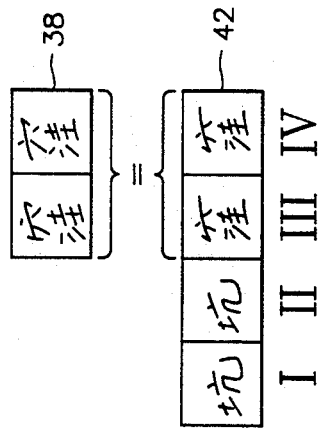

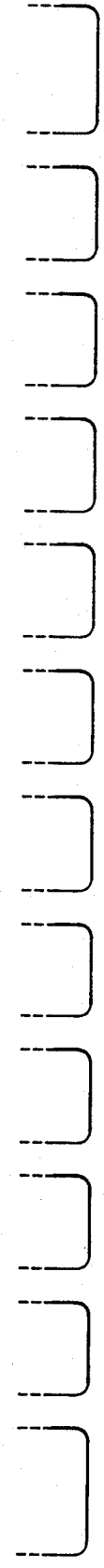
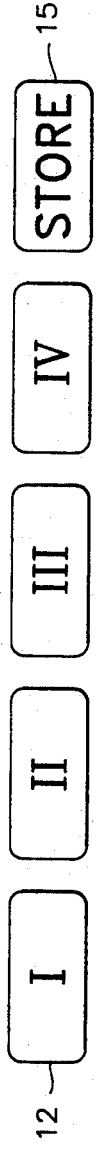
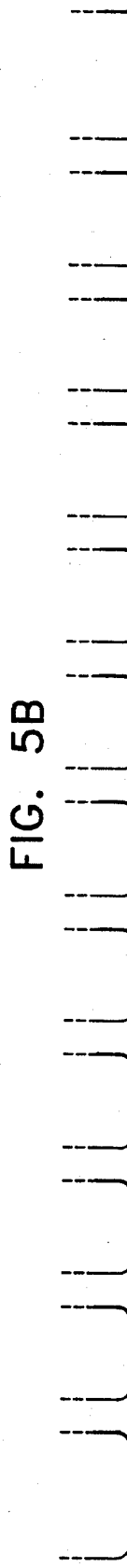
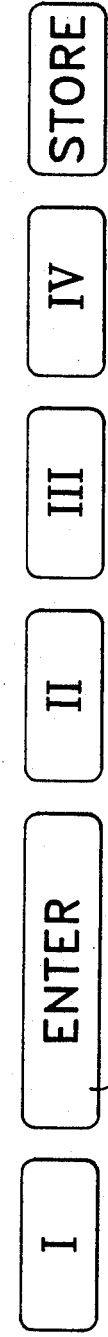
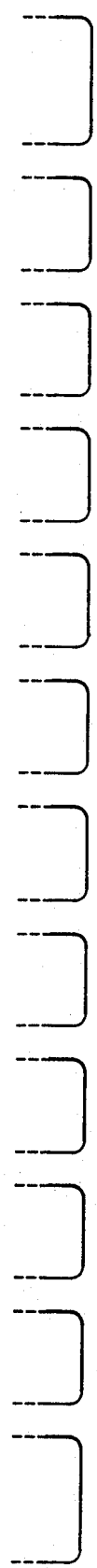
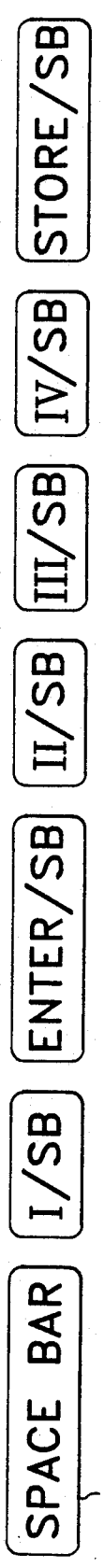
FIG. 5A
FIG. 5B
FIG. 5C
SB = SPACE BAR

ALPHABETIC KEYBOARD ARRANGEMENT FOR TYPING MANDARIN CHINESE PHONETIC DATA

This is a divisional patent application of application Ser. No. 07/357,499 filed May 26, 1989, which is a continuation of application Ser. No. 06/551,555 filed Nov. 14, 1983, now abandoned.

SUMMARY OF THE INVENTION

The invention discloses a new method of coded entry of Chinese character text data into any electronic data processing, communication, display, printing, etc. system, and an electronic keyboard suitable for the method. The keyboard has keys for entering, according to a phonetic notation of a chosen Chinese dialect, all the phonetic data of the characters making up the text, and some "character position keys" with special function in the encoding process.

Each coded composite keyboard signal generated at the end of a typing sequence (corresponding to one block of characters in the text) can itself serve as the intended specific coded signal identifying the character(s) in that block. These signals can also be further converted, one by one, by conventional computer operations into those signals coded in the "character codes" required by the text processing system into which the data entry is made.

Apart from optional shortened typing sequences for encoding some categories of frequent characters, the operator encodes the text character-block by character-block, where a block may contain one or more characters. If a block is phonetically unique, the encoding is effected simply by entering on the keyboard the phonetic data of the block. If a block is phonetically not unique, the operator first enters the phonetic data of a longer bock which is commonly used in Chinese, is phonetically unique, and contains the block to be encoded, and then, as the final step of the same encoding typing sequence, he enters on the "character position keys" the position(s) which the character(s) of the block to be encoded occupy in that longer block.

In an alternative embodiment, an acoustic speech sound analyzer substitutes for the functions of the phonetic data keys, or even for those of the special function keys, of the keyboard.

THE FIELD OF THE INVENTION

The present invention relates to methods and equipments for encoding texts written in Chinese characters, in particular to those that use an electronic keyboard for the encoding. The encoding can also be called data entry when the data are characters or words of a text, and it consists of generating by the keyboard sequentially coded electronic signals, or strings of signals, each uniquely representing one or several of the Chinese characters making up, in sequence, the text which is to be encoded. After the encoding process at the keyboard, these signals can be further converted by conventional processes of a data processing system (computer) into another set of signals coded in the "character codes" (character generating program codes) required by the equipment into which the text data entry is made. The signals carrying the character codes can also be variously stored.

Related inventions have been found, mainly, under the following U.S. patent classification classes and subclasses: 178/30; 340/365R; 364/419; 400/83; 400/110; 400/484.

THE BACKGROUND AND THE OBJECTS OF THE INVENTION

With the great development of the information and communication industries in the last decades there has arisen a growing need for fast, accurate and versatile mechanical processing of written material in all the major languages. As to processing Chinese texts with the same speed and accuracy as has been achieved with many alphabetic texts, the greatest obstacle has been the well-known fact of the great number and complexity of the Chinese characters. Apart from only historically used characters, a modern Chinese still uses about 8-10,000 characters, with 3-4,000 in everyday use.

The decoding of these characters, that is, the converting (back) of already generated electronic signals structured by a given system of character codes into the original visual forms of the characters (on CRT screens or by various types of printers at computer output terminals), as this can be done completely mechanically, has been the lesser problem, and at present there are already several quite satisfactory methods and equipments available for this purpose.

The encoding of such characters, however, has to be done by human (intelligent) operators, and the finding or devising of fast and accurate ways of encoding Chinese characters has been a persisting problem, as the great number of various attempts in the field, proposed year by year even up to now, clearly shown. The present invention also addresses this problem, and its overall object is to devise an encoding method (and a keyboard or other equipment suitable for the method) that is more congenial to the peculiar features of the Chinese language and therefore easier and faster than those in previous art.

In almost all the encoding systems used or proposed so far, the data that are entered on a keyboard are graphic or visual, usually graphic component parts of the characters, by which a classification or indexing of the characters is attempted. The great variety of these graphic components and of their location in the character wholes, however, makes it difficult to achieve a complete and yet not too complex classification. A few of the existing or proposed systems also use the phonetic data (the pronunciation) of the characters, in most of such cases the phonetic data being used together with the graphic data, in particular when the encoding takes place in two steps, the phonetic data to be used in the first or the second step.

No encoding system, it seems, has been proposed so far which would use merely the phonetic data. The reason for this is that, while the number of written characters is great, the phonetic "repertoire" (more exactly, the number of speech morphemes) of any given Chinese dialect is rather limited, and therefore homophone characters, different characters with exactly the same pronunciation, are very numerous in Chinese.

Equally important is, however, the fact that especially in the last 30-40 years much has been done by educational and cultural institutions to standardize the pronunciation of Chinese, in particular that of the official language, Mandarin Chinese. Almost all literate Chinese educated in the last 30-40 years know the "official pronunciation" of Mandarin Chinese and are moreover familiar with one or another (Chinese-style or alphabetized) system of phonetic notation or symbols by which the pronunciation is written down. The availability of standard phonetic notations, and the realization that there are speech patterns, explained below, by which Chinese characters can uniquely be defined, are the grounds for the further object of the invention to devise an encoding system based on phonetic data alone.

In the encoding systems proposed so far, whatever kind of data or keyboard they use, Chinese characters are identified and encoded singly, as discrete units, one by one. These methods try to find certain characteristics "inside" each character by which it can be distinguished from every other character. It is true that most Chinese characters in their origin have been idcographs, self-contained graphic representations of things or ideas, and there are grounds for treating and identifying them singly, in themselves. But in modern Chinese, especially in a running text, written sentence by sentence, the characters appear in groups or blocks, largely following the grammatical patterns of the spoken language. What we see in a modern Chinese text is not simply a row (or column) of individual characters but more often groups of characters, easily identifiable two-, three- or four-characters blocks, following one another. A further object of the invention is to utilize this feature of modern Chinese texts and make it a rule to encode Chinese characters, at least most of the, in principle, as blocks of characters, not one by one. The problem, then, of resolving the ambiguity of homophone characters shifts to that of homophone character blocks, which are very few in Chinese. And the still remaining ambiguities among homophone character blocks can be resolved and the desired characters identified by a method imitating a certain speech pattern in Chinese.

Careful speech in Chinese is most of the time unambiguous because in speech there is even more frequent use of longer blocks or strings of speech morphemes, paralleling the blocks of characters mentioned above, the meanings of which in most cases are unambiguous. Moreover, there are several speech patterns widely used by literate speakers of Chinese whenever the necessity arises to identify to the listener a certain Chinese character or characters. In the most common pattern, the speaker pronounces a longer string of speech morphemes (an expression of several syllables) which uniquely define a block of Chinese characters of the same length, and then he indicates that the character in question is the first, the second, the third, etc. among the characters in the longer expression just pronounced. This speech pattern is very common among literate speakers of Chinese, and a further object of the invention is to make use of this pattern as well, formalize it, extend its scope, and make it also one of the encoding rules whenever character blocks that have homophones are to be encoded.

A still further object of the invention is to provide, within its scope and the method described, an alternative embodiment in which an acoustic speech sound analyzer (a preliminary speech sound encoder) substitutes for the functions of the phonetic data keys, or even for those of other keys, of the keyboard. This speech sound analyzer is programmed to produce, after recognizing the individual speech sounds or whole speech morphemes, specific electronic signal strings that have the same distinctiveness and therefore the same identifying force as those which the actuation of the respective keys on the keyboard would produce. The limited speech morpheme range of the Chinese dialects actually makes their speech sound analysis much easier than that in the case of most other languages.

As conceived in the present invention, the encoding is done essentially at the keyboard by a variety of specific sequences of keystrokes, on speech sound keys and other special function keys, defined by the encoding rules (or by the articulate reading-in of the pronunciation of Chinese characters and actuation of some special function keys, all in specific sequences, if the acoustic speech sound analyzer embodiment is used). The sequentially coded signals generated by the keyboard (or those generated by the speech sound analyzer) are in every case specific enough to uniquely identify the character or characters to be encoded. The method and equipment disclosed in this invention have been designed to achieve this end; this end also defines the proper scope of the invention.

It is understood, however, that the keyboard (or the speech sound analyzer) is only a part of the whole data entry apparatus. That is, the invention relates only to a part or a stage of the whole data entry process.

In almost every practical application of the invention, the coded keyboard signals will have to be subsequently converted or translated, one by one, into another set of signals coded in the "character codes" (specific signals for each different Chinese character) used in that particular word processing, communication, display, printing, etc. equipment into which the data entry is made. This code conversion can be done, for example, by the conventional operations of an electronic data processing system (computer) appropriately programmed and provided with a memory section with a sufficiently large number of memory locations which are identifiable by the keyboard signals and in which the pertinent (finally required) "character code" data are stored. When the computer receives from the encoding keyboard one of the many previously determined possible coded signals, this signal serves as a memory address identifier, and then the computer's control section finds the address thus identified, retrieves the information previously stored there—which is one or several "character codes" (in the present method it is possible to encode more than one character by just one keystroke sequence)—and feeds this character code information into the equipment into which the data entry is made.

It is essential that the keyboard signals be specific enough so that they could be unambiguously converted into another set of signals structured by one or another kind of "characters codes," but whether or not these keyboard signals are converted and by what kind of computer operations such a code conversion is accomplished lie outside of the scope of the invention, as are the mechanical details of the keyboard or those of the above mentioned speech sound analyzer.

It is, finally, also an object of the present invention to accomplish the encoding in one step. According to the method and equipment described here, there remains no ambiguity (requiring further steps to resolve it) as to which character or characters are encoded once one sequence of keyboard actunctions has been completed. Ideally, therefore, the encoding is very fast. At the same time, it must be noted that in using this method and equipment a rather high level of literacy in Chinese, familiarity with character combinations in the language, and knowledge of the exact pronunciation of the characters is required on the part of the operators. Even well qualified operators may occasionally have to look up a dictionary or some character index or manual, as a previous step, before entering the data on the keyboard, but such occasions will be rare. To avoid mistakes in the encoding, the invention allows (and would even recommend) the use of a control monitor CRT screen which immediately displays to the operator the just encoded characters, but this is not an essential part of the equipment disclosed here.

In an overall assessment, the present invention requires a rather high level of literacy in Chinese on the part of the operator, but on the other hand it incorporates several important features of the Chinese language not utilized in prior art, and so it offers a new text-encoding tool faster, easier and more congenial to the language than other methods. Text data entry with this method and equipment is, in a way, like one literate speaker of Chinese "talking" to another. Also, this method and equipment can be a very convenient tool when one is encoding a text not yet written but to be freely composed at the keyboard. One can encode characters with this method even if he does not know (or is not sure of) their exact graphical composition, provided he knows their pronunciation.

Below is a detailed description of the encoding method and equipment. Some points of the description are clarified by drawings accompanying the text.

LIST OF DRAWINGS ACCOMPANYING THE DETAILED DESCRIPTION

FIG. 2 is a schematic representation of the distribution of "content" and "function" characters in a sample Chinese text;

FIG. 3 is a table showing selected Chinese characters, used as samples in the description, with their phonetic and morphemic data in Mandarin Chinese;

FIGS. 4a–4g are schematic representations showing how by referring to parts of longer character blocks shorter blocks can be identified;

FIGS. 5a–4c show some of the other possible arrangements, besides that in FIGS. 1a and 1b, of the "character position keys," encoding control keys, and the space bar on a keyboard to be used in the present invention.

DETAILED DESCRIPTION

Figure 1A:
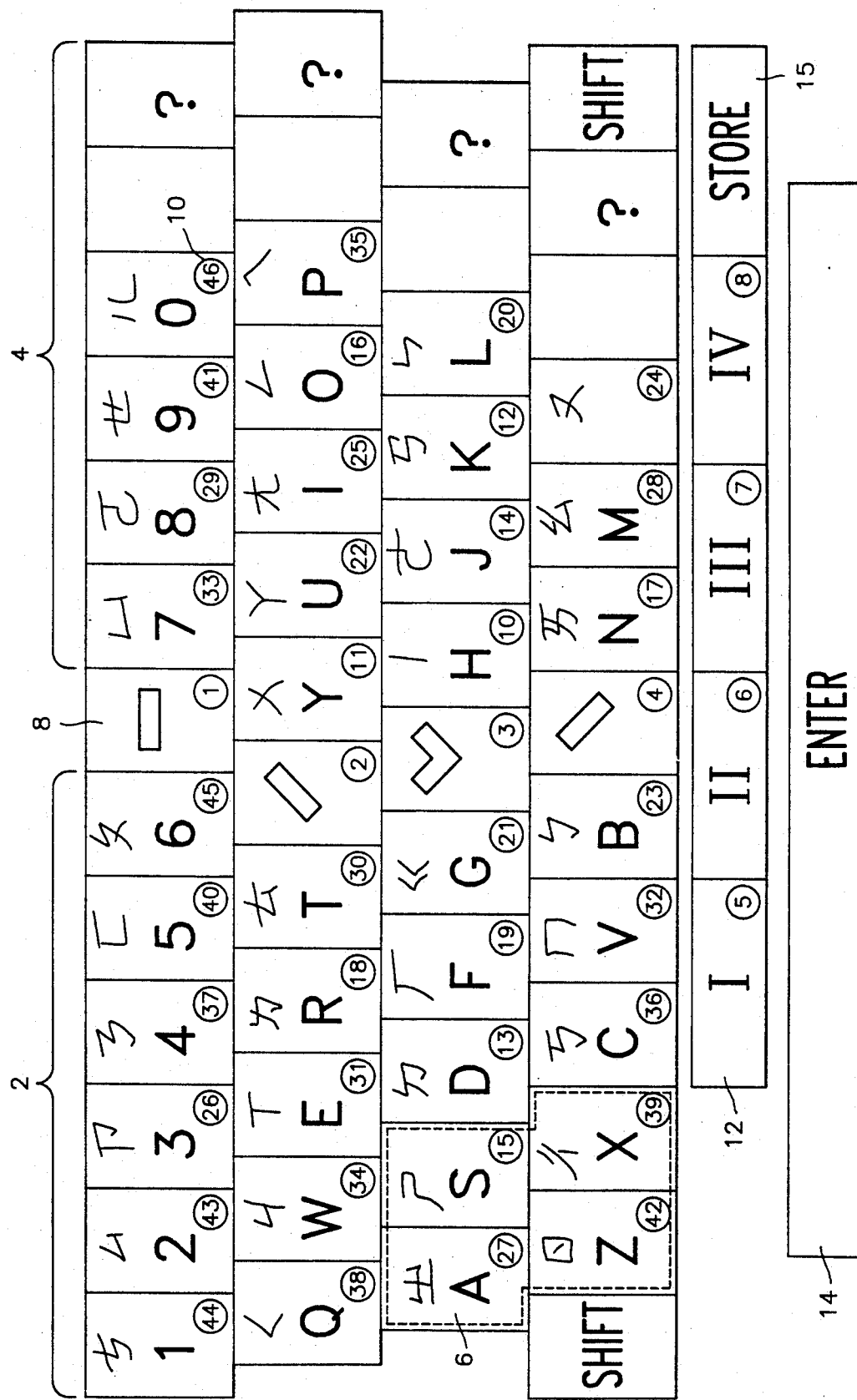
FIGS. 1a and 1b are schematic representations of the preferred embodiments of the new keyboard arrangements designed for encoding Chinese texts in the Mandarin Chinese pronunciation.

Phonetic Data, Phonetic Notations, and the Encoding Keyboard

In one of the two alternative embodiments of the present invention, the equipment used for encoding is an electronic keyboard on which the operator enters the phonetic data of the characters. In much of the following description of the encoding rules this first embodiment is kept in mind. The other embodiment will be mentioned toward the end of the description.

The first encoding rule, using the keyboard version of the equipment, can be formulated as follows:

Rule 1: IN THE PROCESS OF TEXT ENCODING, THE ENTRY OF THE PHONETIC DATA OF A CHINESE CHARACTER IS DONE FIRST BY ACTUATING, ON ANY SUITABLE KEYBOARD, IN THE ORDER OF THE PRONUNCIATION, THE KEY(S) BEARING THE PHONETIC SYMBOL (S) OF THE INDIVIDUAL SPEECH SOUND(S) MAKING UP THE PHONETIC SYLLABLE WHICH IS THE PRONUNCIATION OF THAT CHARACTER, AND THEN ACTUATING THAT ONE KEY, FROM AMONG THE KEYS BEARING THE TONE QUALITY SYMBOLS, WHICH CORRESPONDS TO THE TONE QUALITY OF THAT SYLLABLE, ALL ACCORDING TO A GIVEN STANDARD PHONETIC NOTATION SYSTEM OF A CHINESE DIALECT CHOSEN FOR THE TEXT ENCODING.

The individual speech sounds are what are commonly referred to as consonants, vowels, etc. in a spoken language. In all Chinese dialects, the pronunciation (reading out) of a character always constitutes a phonetic syllable, made up of one or several individual speech sounds. In Chinese, the individual speech sounds can be divided into two groups: the so-called "initials," which always stand at the beginning of a phonetic syllable (or stand alone if no other speech sound follows them) and the so-called "finals," which always stand at the end of a phonetic syllable (or stand alone of no other speech sound precedes them). Three of the speech sounds are usually "finals," but sometimes they can occupy a middle position between an "initial" and a "final"; these three are also referred to as "medials."

In every Chinese dialect each phonetic syllable has, in addition, a definite "tone," a characteristic syllable intonation (pitch change) pattern. A given combination of an initial and a final, for example, can be pronounced in a number of different tones, each of these tones making that combination a different word (or word-component, and therefore a different speech morpheme) in Chinese. The number of tones varies according to the dialects; Mandarin Chinese, for example, has four tones. It is clear, then, that these tone qualities are among the relevant phonetic data in Chinese and that they must also somehow be entered on the keyboard.

There are various phonetic notations (phonetic symbols) for visually representing the individual speech sounds and the tone qualities in a given Chinese dialect, and the present encoding method is not restricted to any of them; in principle any of them can be used. Some phonetic notation systems use the letters, or groups of letters, of the Roman alphabet to represent Chinese speech sounds; the so-called *pinyin* system, now widely used on the Chinese Mainland, is one of them. There is also a notation system which uses Chinese-style symbols for the speech sounds; it is called the (Chinese) National Phonetic Alphabet, developed more than 50 years ago and widely used, especially in the last 20–30 years, in Taiwan and other areas with Chinese speaking populations. Both the *pinyin* system and the National Phonetic Alphabet are phonetic notations for the official Mandarin Chinese. These are the most important phonetic notations in current use, but, for example, Cantonese and Taiwanese Chinese also have already standardized respective alphabetic phonetic notations, and either of these can also be used, in principle, in encoding texts with the present method.

In all the notation systems there are also special symbols for the tone qualities. Most commonly, the shapes of these symbols are graphic imitations of the pitch changes in the phonetic syllable; for example, a level pitch is marked by a short horizontal line, a falling-rising pitch by a broken (v-shaped) horizontal line, etc. As to their position, the tone marks are either superscripts in some of the alphabetic notations or index numbers or symbols (affixed to the upper right-hand corner of the main phonetic symbol string) in other alphabetic or in the Chinese-style notation.

The individual speech sounds, according to Rule 1, are to be entered on the keyboard in the order in which they are pronounced. The tone qualities, however, have the special characteristic of being inherent to the whole phonetic syllable, and so there is no immediately evident place for them in the sequence of the phonetic data as they are entered on the keyboard. Rule 1 requires (arbitrarily) that the tone quality data are entered immediately *after* the individual speech sound data, for each syllable. But this is not an essential point in the method here described; no change needs to be made, in principle, in the encoding method if the tone quality data are regularly entered somewhere else in the sequence.

The present invention does not specify the particular markings of the keys or the number and the arrangement of the keys on the keyboard on which the operator effects the encoding, using the present method. In most respects, the keyboard can be a conventional alphanumeric electronic keyboard or computer input terminal, or a slightly altered version of any king of such keyboards. And the keys of the keyboard generate sequentially (linearly) coded electronic input signals and command signals in the conventional manner. To be used for the here described encoding method, and so to be within the scope of the invention, it is required and sufficient that the keyboard contain (1) keys, used individually or in combinations, for the entering, according to a chosen standard phonetic notation system, the individual speech sound data of a Chinese dialect, (2) keys for entering the tone quality data, and (3) a set of "character position keys" with special function in the encoding (explained below). These character position keys can be either in the same general area where the other keys are located or in a different area, constituting a separate (smaller) keyboard section; because they are often used, it is preferred that these keys are integrated into the main keyboard, but this is not essential.

"Keyboard" in this description, in most places, just means "any suitable keyboard" which satisfies the three criteria above but the other details of which are not specified or restricted. But, in addition, the present invention also discloses two new designs for keyboard arrangement for phonetic data entry, and therefore also for encoding Chinese texts, in the Mandarin Chinese pronunciation. In the immediately following section and in some later sections, as the context makes it clear, "keyboard" will mean on or the other of these keyboards with special, new key-arrangement. These new key-arrangements for a phonetic data entry keyboard are in many respects different from those found in prior art, and they are viewed as ones optimally satisfying the needs for a fast and accurate typing action when data entry is to be effected in the Mandarin Chinese pronunciation, either for text encoding or for other purposes.

The preferred embodiment of one of the new keyboard arrangements for phonetic data entry in Mandarin Chinese is schematically illustrated in FIG. 1a, where each square represents a key. Its characteristic features are the following. The majority of the keys, divided into two sections, 2 and 4, are the keys for entering the individual speech sound data. Each of these keys bears two symbols that can serve as phonetic notation: one is a symbol of the Chinese-style National Phonetic Alphabet (altogether 37 symbols) and the other a letter of the Roman alphabet (or on some keys an Arabic numeral) so that the operator can do the encoding using either of these notation systems, whichever he is more familiar with. It is irrelevant whether the Chinese-style symbol or the letter of the alphabet is placed above the other on the individual keys.

The arrangement of the letters of the Roman alphabet is the same as that on a standard English typewriter, but in situations in which the operator would be more familiar with another kind of alphabetic keyboard this could also be the arrangement of a standard Spanish, French, etc., or even Greek or Russian, keyboard. The underlying reason is not to require from the operator to learn a new typing technique: as to typing the letters of the alphabet, he can make use of the typing technique he already has.

The Chinese-style phonetic symbols are arranged this way. In the left-hand half of the keyboard 2 are the symbols for the "initial" speech sounds, placed so that (based on a careful count) the more frequently one is used the nearer it is placed to the center of the keyboard and the nearer to, or on, the row of keys on which the operator's fingers rest. Effort has also been made, moreover, to place the symbols of the initials of the same phonetic category (e.g. bilabials, dentals, palatals, etc.) near or contiguous to one another, forming certain blocks or patches on the keyboard, optionally to be further distinguished by slightly differently colored key-tops for each group. In FIG. 1a, dashed lines 6 indicate one of these groups. This arrangement can help the operator familiar with the Chinese-style phonetic symbols because whenever these are listed, as when they are taught in school or arranged in a dictionary, they have a fixed order (like that of the letters of an alphabet) and within the order they are grouped according to their phonetic categories.

In the right-hand half of the keyboard 4 are the symbols of the "final" speech sounds, again so placed that the more frequently one is used the nearer it is to the center of the keyboard and the nearer to, or on, the base row for the fingers, with the "medials" (those with key code numbers 10, 11 and 33) nearest to the center. Attention has also been paid to place the symbols of phonetically similar speech sounds together, though here the groupings are not so evident or helpful to the operator as they are on the left-hand half, and need not be further distinguished by color coding.

In the center of the keyboard, arranged in FIG. 1a more or less vertically, are four keys 8 marked with symbols of the four tones in Mandarin Chinese. These are to enter the tone characteristics of the phonetic syllables. In this keyboard design, that these tone keys are arranged vertically (as shown in FIG. 1a) is not essential; what is essential is only that they are placed at the center of the keyboard, because these are the most frequently used keys. It will also be seen in FIG. 1a that the tone keys are additional to the speech sound phonetic symbol keys, and thereby the standard alphabetic arrangement, otherwise retained, is in one respect altered: a gap corresponding to one key (or possibly two keys) is introduced between the left-hand operated and the right-hand operated keys. Operators, however, can easily adjust to this small change and no new typing technique has to be learned.

Preferably the operator strikes the tone keys always with his left-hand index finger. Thus most of the time the encoding of a phonetic syllable consists of a strike with a left-hand finger, followed by one or two strikes with right-hand fingers, and finally another strike (on a tone key) by the left-hand index finger. To achieve this convenient alternate use of fingers of the two hands has been one of the guiding principles in designing the keyboard.

In the lower right-hand corner or each square representing a speech sound key or tone key there is an encircled number 10, which here is just an arbitrary decimal-number key code, a numerical equivalent to that (binary) coded signal that the acutation of the key generates. (Attention has been paid, nevertheless, to the relative frequency with which each of these keys are used, and the code numbers have on the whole been assigned in the order of frequency, with the most frequent ones having the lowerest code numbers.) References will be made to these key codes later in the description when examples for encoding are given. Empty squares are for punctuation and other marks or symbols; those with a question mark in them are optional keys in case more are needed.

Figure 1B:
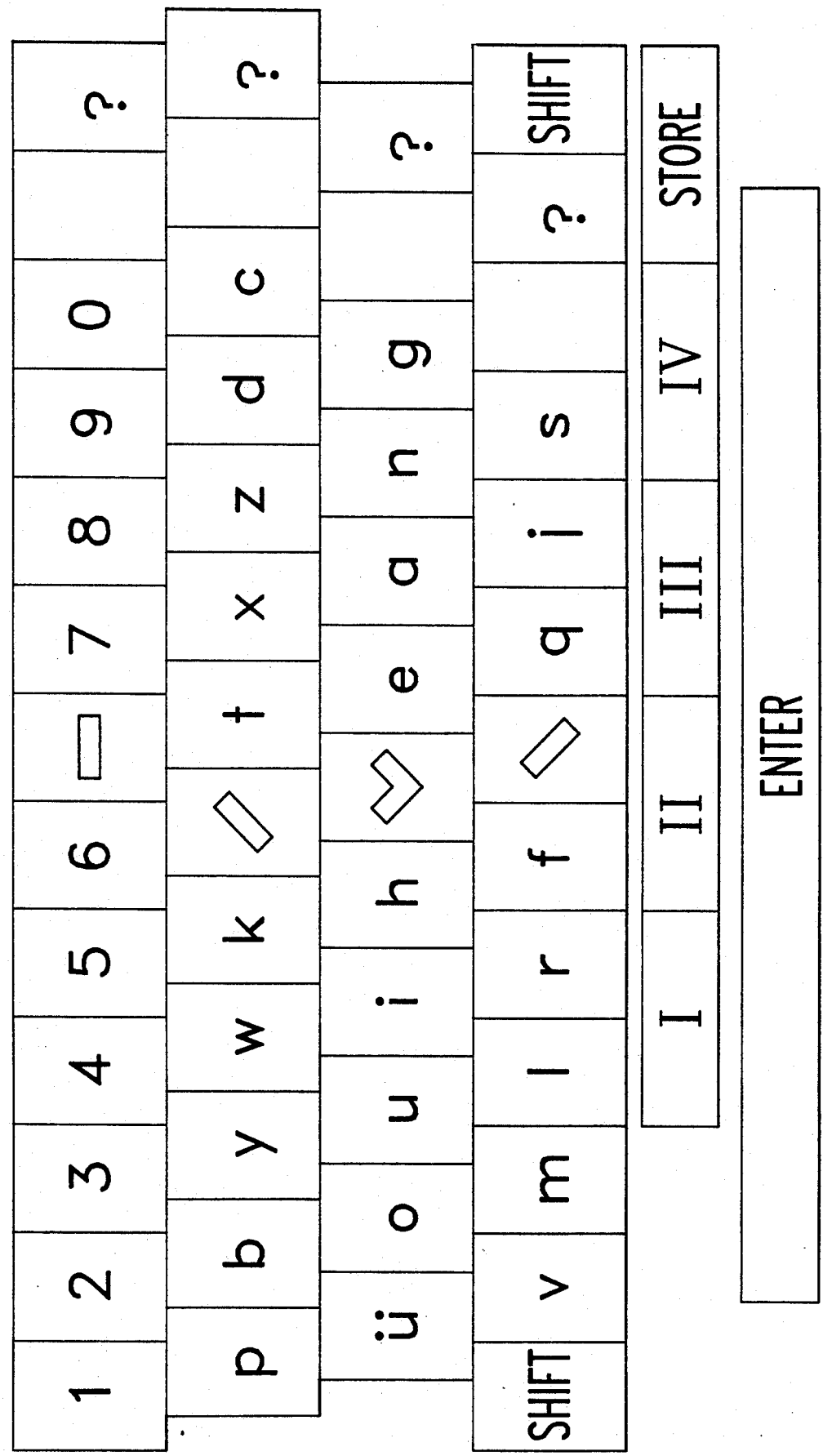

FIG. 1b discloses the preferred embodiment of another keyboard arrangement, designed especially for conditions in which the keyboard is used only or principally for Chinese text data entry by the *pinyin* phonetic notation (or romanization) system now in official use on China Mainland (People's Republic of China). Besides its use as an encoding keyboard for texts written in the traditional Chinese characters, such a keyboard arrangement can also be adopted for an ordinary Roman-alphabetic typewriter for typing Chinese in *pinyin* romanization.

The characteristics of the arrangement shown in FIG. 1b are as follows. The keys bearing the letters of the alphabet are arranged in three rows as on a conventional typewriter for Western alphabetic writing systems. (The letter v is not used in the *pinyin* notation, but it can still be retained, and given a key, in case some other text, not the *pinyin* notation, is to be typed on the keyboard.) The speech sounds that constitute the syllable "finals" in Mandarin Chinese—that is, the vowels, especially a, i, o and u, and the two consonants n and g—appear in a great variety of combinations (ai, ia, ao, ou, uo, iu, ui, an, na, in, ni, ang, ing, ong, et.), so that the keys bearing them have been so arranged that each is usually struck by a different finger; this way the repeated use of the same finger when typing is in almost all cases eliminated. The same keys, bearing the letters for syllable "finals," are also the most often used ones, and they are all placed on the middle row, where the fingers usually rest. As to the keys for the syllable "initials," based on a frequency count, the most frequently used ones will usually be struck by the index fingers, the second most frequently used ones by the middle fingers, and the rest by the ring or small fingers, of either hand. The keys bearing the four tone symbols—as in FIG. 1a—are placed in the center of the keyboard, preferably vertically, as shown, but they can occupy other relative positions as well, as long as they are in the center.

Later in the description, the various ways of encoding will be illustrated with reference to the new design of keyboard arrangement shown in FIG. 1a. But, as has been said, the scope of the invention includes encoding on *any* keyboard design or arrangement satisfying the three main criteria listed earlier.

Figure 6A:
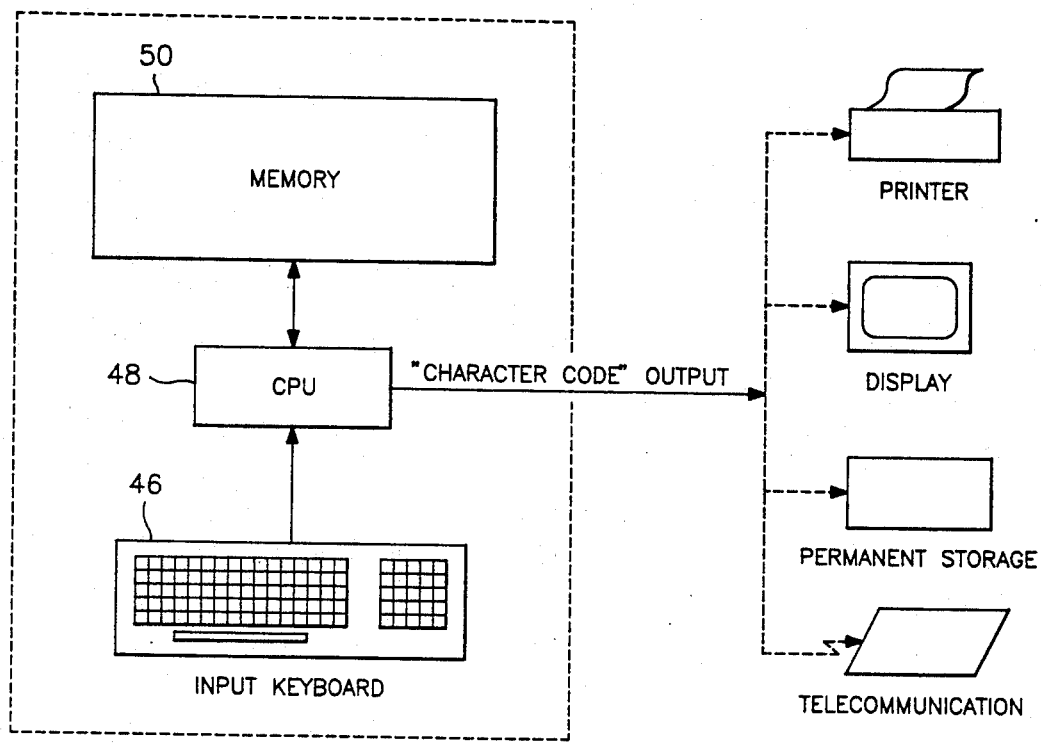
FIGS. 6A and 6B are system block diagrams which shows the basic input, output, processing and storage components of the present invention, in two different embodiments.

In FIG. 6A, a block diagram shows the elements which make up an embodiment of the present invention in the case in which only a keyboard is used for data entry. The electronic input keyboard 46 has been described above. The CPU 48 can be that of any type or make of a conventional electronic data processing device (computer). The memory 50 is a bulk storage in which there is a memory location for each different keyboard signal string determined by the encoding typing method and in which the information stored at each location is the "character code" information for one or more Chinese characters.

Encoding by Blocks of Characters

In a Chinese text, especially in modern Chinese, two kinds of characters can be distinguished. One kind are those that carry the main meanings and can be called the "content characters"; they are roughly equivalent to the nouns, verbs, adjectives and adverbs in other languages. The other kind of characters perform, most often, only certain grammatical functions in the sentences and can be called "function characters"; they are again roughly equivalent to the conjunctions, auxiliary verbs, linking verbs (copulas), verb-, noun-, adjective- or adverb-endings, prefixed, suffixes, prepositions, etc. in English and other Indo-European languages. FIG. 2 schematically illustrates the distribution of these two kinds of characters in a sample Chinese text. The square or blocks drawn in heavy lines indicate content characters, and those drawn in fine lines the function characters, with all the function characters and some of the content characters filled in.

In reality, especially in a printed Chinese text, there are no such gaps or spacings between characters that appear in FIG. 2; all characters are written or printed equally close to one another, the only gaps being the occasional punctuation marks. In the eyes of anyone, however, who can read Chinese, especially if he is an experienced reader, the characters do "group together" or "separate" just as it is indicated in FIG. 2.

The new encoding method in the present invention concerns itself basically only with the encoding of the content characters. The function characters make up only a small group of about 50-100 different characters, their number depending on the interpretation of what makes a character a "function character." For the encoding of the function characters—as it is done in several other encoding systems—special, optional, short-cut or irregular encoding processes can be set up (and special memory locations prepared in the connected code converter computer accordingly) whereby, for example, disregarding their possible homophones (other characters with the same pronunciation), the entering of their phonetic data alone, or even just part of their phonetic data, generates special short keyboard signal strings that can be immediately converted by the computer into the desired signals carrying the corresponding character codes. As these function characters are few, the operator can easily remember and recognize them in the text, and he will know when to employ such special shortened encoding steps. No particular or new short-cut method is, however, disclosed here, in this description, for the special handling of function characters or other categories of commonly occurring characters. The encoding method disclosed here, as has between said, concerns itself basically only with the encoding of the content characters, which to be sure constitute the large majority of the characters in any text.

And every character, even function characters, whenever necessary (for example, when any of them appears in isolation or when no optional short-cut encoding method has been set up), can be encoded with this new method as a content character, without short-cuts.

The second major rule of the encoding method presented here can be formulated as this:

Rule 2: WITH THE FUNCTION CHARACTERS AND SOME OTHER CATEGORIES OF FREQUENTLY OCCURRING CHARACTERS AS OPTIONAL EXCEPTIONS, CHARACTERS ARE ENCODED IN BLOCKS, ALWAYS ONE BLOCK BY ONE UNINTERRUPTED TYPING SEQUENCE.

The length of the blocks varies, as it depends on the text. FIG. 2 can again be inspected to see the various lengths of the blocks in a sample text. A border case, though not an uncommon case, is when a block contains only one character. More frequently it will contain two characters, and less frequently three or four characters. Though the present method does not limit in principle the length of the blocks, the length of the *content* character blocks rarely exceeds that of four characters, and practically all of such long blocks can clearly be divided into meaningful constituent parts, that is, into smaller blocks, and encoded separately.

It is therefore important for the operator using this method to know which content characters in Chinese do form a block and which do not, and yet it is not possible, or necessary, to state here the exact conditions under which characters constitute a "block" in the sense used in Rule 2. The most common and practical criterion of what makes a group of characters a "block" would be that they together express just one single meaning (refer to one idea, one action, one things, etc.). In most cases, one block when translated into an alphabetic language would there be just one word (simple or compound word). Again, it could be said that a group of characters would be a "block" if it would qualify to be a dictionary entry in a Chinese dictionary. Sometimes only the fact that certain characters are very frequently used together would qualify them to be treated as a "block." To define the nature and the limits of such blocks is a linguistic problem. In describing the encoding method of the invention it is not necessary to give such definitions; it is enough to point to the unquestioned existence of such blocks in both spoken and written Chinese and state how to treat them when encoding.

Even if different operators judge the same groups of characters differently, no ambiguities will arise in the present encoding system. For example, in the list of characters in FIG. 3, Characters 0001 and 0005, when they appear in a text one after the other in this order, could be judged by some as a true "block," but because this combination is not frequent some might take Character 0001 as a single-character block being a verb and Character 0005 as another single-character block being the verb's object and encode the two characters accordingly as two blocks. If the encoding follows the rules stated below, the resulting coded keyboard signals in the two cases will be different, but in both cases these signals will equally unambiguously effect the encoding, uniquely identifying a two-character block (made up of Characters 0001 and 0005) in the first case or identifying two single-character blocks (Character 0001 and Character 0005), one after the other, in the second case.

In view of such possibly different interpretations on the part of the operators as to which characters form a block, it is necessary that, if the keyboard signals are to be further converted by a computer into signals carrying the character codes, corresponding memory locations be set up in the computer memory for the respective varieties in the encoding. But this does not mean that an indefinitely large number of additional memory locations would be needed. For most blocks the operators' interpretations will be uniform, and in these cases one memory location for each is enough. Only for the remaining such smaller number of cases will it be necessary to set up two or three locations for each case.

In encoding every block there are two possibilities. (1) The first possibility is that there is no other character block in Chinese that has the same pronunciation, in the dialect in which the encoding is done, as the block to be encoded. In this case, the individual speech sounds and the tone quality (or qualities) of the character(s) forming the block, and likewise these phonetic data entered on the keyboard and the resulting keyboard signal string, can be itself uniquely identify the block and the character(s) in it. (2) The other possibility is that there is or are other blocks in Chinese containing different characters but still having the same pronunciation as the block to be encoded; in other words, the block is one of two or more homophone blocks. And in this case the block's phonetic data alone cannot single it out from among its homophones.

Only approximate figures can be given for the relative frequency of occurrence of these two possibilities. Of the one-character blocks up to 80-90 percent would have homophones. But for the blocks containing two or more characters the situation is just the reverse: up to 90-95 percent of them are estimated to be phonetically unique, with no homophones, and for such blocks their phonetic data can serve as unique identifiers.

Encoding Phonetically Unique Blocks

The encoding of a phonetically unique block is straightforward in the present method, as formulated in the following rule:

Rule 3: A PHONETICALLY UNIQUE CHARACTER BLOCK IS ENCODED BY ENTERING ON THE KEYBOARD THE PHONETIC DATA OF THE CHARACTER(S) CONSTITUTING THE BLOCK ITSELF ONLY.

For example, in FIG. 2, Block 16, though a single-character block, is phonetically unique. The phonetic data of the character that constitutes this block can be inspected in FIG. 3, where the (arbitrary) character code for this character is 0001. To encode this block according to the *pinyin* phonetic notation, the operator strikes the keys marked "s," "h," "u" and "o" and then the tone key for the first tone (marked by a horizontal line). Finally he strikes a delimiter key, which indicates the completion of one encoding typing sequence and generates a command signal to input the complete sequence of the coded individual key signals, temporarily stored during one typing sequence, as one composite signal, one complete input, into the code converter computer, if such code conversion is required. FIG. 1a, at the bottom of the drawing, shows one of the possible different arrangements of the character position keys marked with Roman numerals 12 (which will be discussed later) and the keyboard's space bar 14. In this arrangement, besides it usual function, the space bar also serves as the delimiter key whenever the keyboard is used for encoding a Chinese text; so the space bar is here marked with the letters ENTER.

The specific encoding typing sequence for Block 16, encoded in the *pinyin* notation, is then s-h-u-o-    -ENTER    (16a-type)

FIG. 1a also shows the decimal-equivalent code numbers 10 assigned to each key and standing for that binary-numerical) coded signal that each key generates. The encoding typing sequence for Block 16 displayed above can then also be written as a signal string in numerical codes 15-10-22-16-1-ENTER    (16a-num)

If the operator uses the Chinese-style National Phonetic Alphabet notation system (the phonetic symbols for Character 0001 can be inspected in FIG. 3), the resulting signal string in numerical codes will be 15-11-29-1-ENTER    (16b-num)

(The letters "a" and "b" in the designation of the strings refer to the encoding done in the *pinyin* and the Chinese-style notation respectively.)

Each of the generated keyboard signal strings, whether coded as (16a-num) or as (16b-num), can uniquely define a memory location in the memory section of the code converter computer, and the computer can call up the information, the character code, previously stored in these locations. Here, for Block 16, from either of these locations the same single character code, 0001, is called up.

As another example, Block 18 in FIG. 2 is a two-character block and is also phonetically unique. The two characters making up this block are Characters 0002 and 0003 in FIG. 3, and their phonetic data are also listed there. Encoding this block, the operator again types in the phonetic data of the whole block. In the *pinyin* notation the encoding typing sequence is t-i-a-o-    -l-i-    -ENTER    (18a-type)

which will generate the keyboard signal string in numerical codes 30-25-27-16-2-20-25-4-ENTER    (18a-num)

Or, when using the Chinese-style phonetic notation, the generated keyboard signal string in codes is 30-10-28-2-18-10-4-ENTER    (18b-num)

By either of these keyboard signals the same two-character block is defined and encoded, and either can identify a memory location in a code converter computer, the information stored in either of these locations being the same, a double character code, 0002-0003. (Whether that computer, further communicating with a connected display, word processing, printing, etc. equipment, supplies this information as it is, as a double character code input, or first breaks it up and then supplies it as two single character code inputs one after the other, is irrelevant for the present encoding method.)

And likewise, supposing that in FIG. 2 Block 20 (a three-character block) and Block 22 (a four-character block) are also phonetically unique, both are to be encoded by the same process as described for Block 16 and Block 18 above, only the keyboard signal strings for them being longer and the information stored in the memory locations (identified by the signals) in the connected code converter computer being a triple character code and a quadruple character code respectively.

The encoding method described so far, if it would refer to one-character blocks only, would not be new. But as it is here equally applied to blocks of two or more characters, it is definitely new, because it transcends the basic approach in prior art, in which the Chinese characters and data strings used to identify and encode them are treated singly, one by one. In the present method, for example, a two-character block or a three-character block is each treated as just *one* unit in the writing system, as *one* complex unit (with a two-syllable and three-syllable pronunciation respectively), encoded by *one* typing sequence, generating at the keyboard *one* coded signal string, which in a connected code converter computer identifies *one* memory location, where the corresponding *one* (plural) character code information for each complex unit is stored.

In case the operator enters on the keyboard the phonetic data of a phonetically unique character block which has not been considered in preparing the memory files of the code converter computer and there is no memory address there corresponding to the keyboard signal for that block, the computer could, optionally, be programmed to generate a characteristic visual or audible signal (a light or a buzz) which lets the operator know this fact. He must then break up that block into smaller blocks, even up to single-character blocks, and encode by smaller blocks for which it is expected that memory addresses have been prepared.

And in case the operator misjudges a phonetically *not* unique character block for being phonetically unique and encodes that block merely by its own phonetic data immediately followed by the delimiter ENTER signal, the resulting signal string of individual key signals generated by the keyboard would be "incomplete" (that is, lacking one or more of the final components of the full string he should have entered, according to the encoding rule discussed next). In this case, again optionally, the code converter computer can be programmed so that it would recognize such signal strings as "incomplete" and generate a (different) visual or audible signal warning the operator that he should do the encoding again, typing in a correct full key sequence required in such a case. Further optionally, in this second case, memory addresses can be set up identifiable by these "incomplete" keyboard signal strings and in these addresses information stored and automatically displayed to the operator on an additional CRT screen, showing him various relevant character combinations from which he could see the right way of encoding the character block in question. Such programmings could be very helpful, and they need not be too extensive because not any king of misentry, only the typical and so foreseeable "incomplete" entries, have to be covered. But for the data entry method described here such programmings are only auxiliary devices, not essential.

Encoding Phonetically Not Unique Blocks

The following, final, section of the encoding rules, concerning the encoding of character blocks that are phonetically not unique, presents again a completely new approach as it calls for the employment of mechanical devices (special encoding function keys) not used in other methods.

Rule 4: A PHONETICALLY NOT UNIQUE CHARACTER BLOCK IS ENCODED BY ENTERING ON THE KEYBOARD FIRST THE COMPLETE PHONETIC DATA OF ANY COMMON LONGER CHARACTER BLOCK WHICH IS PHONETICALLY UNIQUE AND OF WHICH THE BLOCK TO BE ENCODED IS A PART, AND THEN ENTERING, AS THE FINAL SECTION OF THE SAME TYPING SEQUENCE, ON A SPECIAL SET OF KEYS BEARING THE POSITION MARKS, THE POSITION DATA IDENTIFYING THE POSITION(S) WHICH THE CHARACTER(S) OF THE BLOCK TO BE ENCODED OCCUPY IN THAT LONGER BLOCK.

For example, FIG. 4a, shows a single-character block 24, the character in which is Character 0002 in FIG. 3. This block has several homophones and cannot be identified by its phonetic data alone. If the operator has to encode Block 24, he should first think of a phonetically unique and commonly used longer block of which Block 24 is a part. Suppose—one possibility—that he thinks of Block 18, which appeared in FIG. 2 and has already been discussed, but which is also shown in this FIG. 4a. Block 24 occupies the first position in Block 18. According to Rule 4, then, the operator enters the phonetic data of Block 18 (displayed above as String 18a or String 18b) and adds to it a strike on the character position key marked for the first position, in FIG. 1a bearing arbitrarily the Roman numeral I. The typing sequence in the *pinyin* notation can be written as follows:

t-i-a-o-      -l-i-      -I-ENTER          ($24a_1$-type)

The generated keyboard signal string written in the numerical codes is then 30-25-27-16-2-20-25-4-5-ENTER               ($24a_1$-num)

This keyboard signal string can identify a memory address in the assumed code converter computer, and in this address the stored character code is 0002.

The encoding can also be done using the Chinese-style phonetic notation, in the same manner as described above, but for the sake of brevity here and below the "b" varieties of strings are not further given.

But, when about to encode Block 24, the operator could just as likely—another possibility—have thought, for example, of Block 26, in FIG. 4b, as this is also a common combination, is phonetically unique, and also includes Block 24. Block 26 is composed of Characters 0004 and 0002. In this case, the block to be encoded (Block 24) occupies the second position in the longer block (Block 26), and so in the process of encoding the operator finally strikes the character position key marked II. Here the typing sequence is f-a-      -t-i-a-o-      -II-ENTER          ($24a_2$-type)

and the resulting keyboard signal string in numerical codes 19-27-3-30-25-27-16-2-6-ENTER               ($24a_2$-num)

In the memory location identified by this string the character code information is the same as that in the location identified by String $24a_1$, that is, 0002.

Block 24 can be encoded, as exemplified, with the help of either Block 18 or Block 26. And these are only two of the several possible common longer blocks, readily available in Chinese, that the operator could have thought of. (In designating the encoding strings, the adding of the lower index figures "1" and "2" is intended to show the fact that there are a number of possibilities.) The present encoding method allows several choices of longer blocks with the help of which shorter phonetically not unique blocks can be encoded. Still, this does not mean that an indefinitely large number of memory locations have to be prepared for such possibilities in the assumed code converter computer's memory. The number of the required locations is restricted and manageable by stating that those longer blocks must be "common" blocks, commonly used in Chinese.

It has been said earlier that literate speakers of Chinese have a frequently used pattern for identifying characters in speech (this is the pattern on which Rule 4 is based). And what is frequently used is not only the pattern itself but also the *actual choices of certain longer blocks for identifying given shorter ones*. In the examples given above, a certain character A was identified as being a constituent of the character combination AB or BA. Now the fact is that whenever Chinese speakers use such a pattern to identify A, they customarily refer *only to a few* AB or BA combinations. In everyday usage some combinations have emerged that both speakers and listeners have found most clear, most telling, most adept, and these are the ones used almost every time A is to be identified. Speakers of Chinese, especially native speakers (the expected operators in the practice of the present method), do not have expressly to learn them; they know which these combinations are from the knowledge of the language. (If in the extended practice of the method of the invention it is found that for some rarely used phonetically not unique blocks that kind of "longer blocks" by which native speakers of Chinese would commonly or typically identify them are not readily available, arbitrary "longer blocks" can also be assigned to be used in such cases and a list of shorter blocks in question with the corresponding arbitrarily assigned "longer blocks" be prepared in the form of a manual or index for the operators to consult.)

In preparing the memory locations in the assumed code converter computer, therefore, of all the possible combinations available in the Chinese language, only those commonly or typically used need to be considered. For encoding Block 24, for example, at most 5–6 common combinations as longer blocks need to be considered, and in everyday practice actually only the 2–3 most common ones of these will be used by the operators.

Considering, then, all the cases when a phonetically *not* unique *single-character* block is to be encoded with the help of a longer block, following Rule 4, if out of the 10,000 characters used today for the most frequently used 1000 we allow up to 10 common identifying combinations (longer blocks) to be available for each when they are to be encoded, and proportionately fewer combinations for the less frequently used ones (less frequently used characters naturally have fewer associations in the language), the number of memory locations required for all these cases can be estimated to be around 40–60,000. The cases when *two-character* or *longer* blocks are phonetically *not* unique (and have to encoded, again following Rule 4, with the help of even long blocks) are very few, as said earlier; only a few hundred, or maybe 1-2000, more memory locations would be enough to cover these cases. And going back to the cases of the phonetically *unique* blocks, encoded by Rule 3, the number of such blocks and so the number of separate memory locations required for code conversion when such blocks are encoded can be estimated from the number of the two-, three- or four-character entries in a Chinese dictionary, which depending on its comprehensiveness can be anywhere between 40,000 and 100,000.

The present method requires a great number of memory locations in the assumed code converter computer's memory file system and an extensive preparatory work in storing the information there, but once that has been done the actual encoding at the keyboard is easy as the possibly occurring varieties in the encoding have already been taken care of previously. The operator has only to follow the few major encoding rules; he does not have to remember and apply time and again numerous other detailed rules, as is often the case in other encoding systems. In the present encoding system, the more frequently a character is used, the more easily and congenially to the language, that is, with fewer arbitrary rules to be learned, can that character be encoded. Only in the case of rare characters might the encoding process somewhat slow down (because some thinking or checking might be required) or might be necessary to apply some arbitrary rules.

In the description above, the assumed code converter computer connected with the keyboard converts the coded signal string identifying a phonetically not unique block the same way as that identifying a phonetically unique one, that is, referring simply to one memory location (identified by the full string), where the corresponding (single or plural) character code information is stored. This can be called the *one-string* identifier code conversion operation.

Within the essential framework of the present encoding method, there is the possibility of, at least, one other way of performing the code conversion. This alterative way holds for the encoding and subsequent code conversion of phonetically *not* unique blocks, that is, when the "character position keys" are also used. In this alternative, the typing sequence is slightly altered, but still basically follows Rule 4. The difference is that what was one signal string in the earlier description is now, in this alternative, broken up into *two* signal strings. The first is made up of the individual phonetic data key signals corresponding to the longer character block (with the help of which a shorter block is encoded) and the second of the coded signal or signals resulting from the actuation of one or more "character position keys" as required by Rule 4. The assumed code convertor computer can be so programmed that the (now separate) first signal string identifies a memory location and the information called up from there, which is a plural character code corresponding to the longer character block, is temporarily stored in the computer. And the second signal string, carrying the character position key code or codes, now a separate command signal entering the computer circuit at a different point, instructs the computer to pick out and further transmit from that temporarily stored signal string (carrying a plural character code) only that or those segments of the string (each carrying just one character code) that are specified by the character position key signal(s). To effect this at the keyboard, the operator actuates, immediately after entering the phonetic data of the longer block, a special "(temporarily) STORE" key (15 in FIG. 1a), but otherwise there is no change in the typing sequence, which, in this alternative, for example, for Block 24, in the *pinyin* notation, encoded with the help of the two arbitrarily chosen longer blocks mentioned above, will be t-i-a-o-    -l-i-    -STORE-I-ENTER    ($24a_1$-type-alt)

f-a-    -t-i-a-o-    -STORE-II-ENTER    ($24a_2$-type-alt)

(The letters "alt" in the designation of the strings refer to the alternative, two-string way of computer processing.)

For the computer, however, in this alterative, each of the above typing sequences results in *two* separate signals, which written as numerical code strings will be 30-25-27-16-2-20-25-4-STORE and 5-ENTER    ($24a_1$-num-alt)

19-27-3-30-25-27-16-2-STORE and 6-ENTER    ($24a_2$-num-alt)

Thus, the code converter computer can process a key signal string identifying a phonetically not unique block either, as described first, as a single string or alternatively as broken up into two strings, if that STORE signal is introduced into the typing sequence. Both of these possible ways of code converting operations presuppose that the encoding at the keyboard has been done according to the encoding method of the present invention.

Whether the on-signal-string or the alternative two-signal-string way of processing is employed depends on computer technological considerations and does not effect the encoding method; the code conversion, strickly speaking, lies outside the scope of the invention. It can be pointed out, nevertheless, that in employing the two-signal-string way of processing, the two above mentioned memory file systems—that containing about 40–60,000 locations for use when the encoding follows Rule 4 and that containing 40–100,000 locations required when encoding according to Rule 3—need not be prepared separately: each location originally required in the former file system would then be one already set up in the latter (larger) file system.

Further examples follow to illustrate how phonetically *not* unique *multiple-character* blocks can be encoded by Rule 4. In the following examples, for brevity, only the alphabetic-plus-tone mark typing sequences in the *pinyin* notation, and only the typing sequences required for the one-signal-string way of computer processing, will be indicated.

Block 28 in FIG. 4c consists of Characters 0002 and 0005. This block is phonetically not unique as it has a homophone block, Block 30, shown in FIG. 4e. If the operator wants to encode Block 28, he has to follow Rule 4, and he could very likely think of Block 32 as a longer block with the help of which to encode Block 28. Block 32 consists of Characters 0007, 0002 and 0005, and so the characters making up Block 28 occupy the second and the third position within Block 32. Thus the typing sequence will be y-o-u-    -t-i-a-o-    -l-i--
   -II-III-ENTER    ($28a_1$-type)

And the character code information stored in the memory location identified by the resulting keyboard signal string will be the double character code 0002–0005.

But the operation, to distinguish Block 28 from its homophone, could also have thought of Block 34 as a "helpful" longer block. Block 34, shown in FIG. 4d, contains four characters (0002, 0005, 0008 and 0009), and the positions of the characters of Block 28 within this longer block are the first and the second. The typing sequence will then be

```
t-i-a-o-    -l-i-    -j-i-n-g-    -r-a-n-
     -I-II-ENTER                              (28a₂-type)
```

And if the operator has to encode the homophone of Block 28, that is, Block 30, he would very likely do so with the help of Block 36, in FIG. 4e, as perhaps the only longer combination available for this purpose. Block 36 contains Characters 0006, 0005 and 0010, and so the relevant positions for the characters of Block 30 in this combination are the first and the second. The typing sequence will therefore be

```
t-i-a-o-    -l-i-    -t-a-i-    -I-II-ENTER    (30a-type)
```

Block 38, in FIG. 4f, consisting of two character 0011's, is again phonetically not unique. It has at least one homophone, Block 40, in FIG. 4g, consisting of two Character 0012's. FIG. 4f and FIG. 4g show how these homophone blocks can unambiguously be encoded, for example, with the help of Block 42 (Characters 0013, 0013, 0011 and 0011) and Block 44 (Characters 0012, 0012 and 0014) respectively. The typing sequences will be

```
k-e-n-g-    -k-e-n-g-    -w-a-    -w-a-
     -III-IV-ENTER                            (38a-type)

w-a-    -w-a-    -j-i-a-o-    -I-II-ENTER    (40a-type)
```

Optional Intermediate Morpheme Code Conversion

The present invention also discloses, in addition to the encoding method described above, an optional intermediate "morpheme code conversion" step, which can be performed by a separate unit of the assumed code converter computer. This step would consist in first converting signal strings or definite segments of these string, one by one, into another set of signal strings specified by "morpheme codes," and then using these morpheme-coded strings to identify the locations in the character code information memory system to call up and further input the strings carrying the character codes themselves.

This intermediate step is built on the recognition and novel utilization of a special feature of the Chinese language, and it is offered here because by this step the length of the original keyboard signal strings can be reduced, and this could make the subsequent computer operations simpler and faster.

It has been pointed out that in Chinese the number of the speech morphemes, that is, the number of actually occurring elementary (syllabic) combinations of individual speech sounds, is quite limited. Time and again during the encoding the operator enters the phonetic data of phonetic syllables, which are the pronunciations of individual characters. For each phonetic syllable he strikes a number of speech sound keys, followed by one strike on a tone quality key. For the speech sounds, if he uses an alphabetic notation, he uses the 26 keys bearing the letters of the alphabet, or if he uses the Chinese-style notation, the 37 keys bearing the Chinese-style symbols. For every phonetic syllable he altogether strikes 2–5 alphabetic letter keys or 1–3 Chinese-style symbol keys before he strikes the tone quality key. And since the combinations of individual speech sounds in Chinese are quite limited, the actually occurring speech sound key combinations (sequences) in the encoding are much fewer than all the theoretically possible ones. In Mandarin Chinese, for example, there exist only about 410 speech sound combinations for forming phonetic syllables, if the tone quality variations are not considered. In fact, each of these 410 combinations are pronounced in up to four (for some combinations, fewer) different tones, and each of these tone varieties are different "words" (or word components) in Chinese. But even if these tone varieties are also counted, there are approximately only 1280 different speech morphemes in Mandarin Chinese.

This fact can be utilized. A separate unit of the assumed code converter computer can first convert each keyboard signal string or segment of the string which corresponds to a phonetic syllable into another signal string specified by a "morpheme code," one single code number standing for the whole syllable. For this operation a separate memory file system is needed, but this system would be much smaller than those (discussed earlier) that yield the character code information. In case Mandarin Chinese is used for encoding, only approximately 1280 memory locations are needed in this morpheme code conversion file system. Those segments of the keyboard signal string that correspond to a phonetic syllable would each identify a location in this morpheme code conversion memory file system, and in each location the respective one "morpheme code" information is stored. This information can be called up, and then signals carrying these morpheme codes (instead of the original keyboard signal string) be used in subsequent computer operations. And these signals now specified by the morpheme codes will always be shorter, that is, their linear structure will be specified by fewer code numbers or code elements, than the original keyboard signal strings.

But if this intermediate morpheme code conversion step is to be adopted in the code converter computer, it will be necessary to further separate or delimit each segment of the keyboard signal string corresponding to a phonetic syllable from the segment preceding and following it. As the last key struck entering the data of a phonetic syllable is always a tone quality key, in the encoding system employing this morpheme code conversion step, the tone quality keys, unlike the other speech sound data keys, must be mechanically so constructed that their actuation generates *two* signals one after the other: the first one is the specific coded signal for the tone quality (indicating which tone quality the just entered phonetic syllable has) and the second one a delimiting and command signal indicating to the control section of the morpheme code conversion unit that the data entry of a phonetic syllable has been completed and that the morpheme code conversion is to be performed. In the following, a slash (/) after the code number of the tone quality key represents visually this command signal.

Below are examples showing the morpheme code conversions when encoding some of the character blocks already discussed above. The typing sequences need not be given again as they are exactly the same as those above. Only the linear structures of the signals, expressed by code numbers and other symbols, will be given. The morpheme code numbers are those arbitrary ones listed in FIG. 3.

For encoding Block 16, a single-character phonetically unique block (Character 0001), in Mandarin Chinese and using the *pinyin* phonetic notation, the coded structure of the signals generated in the stages one after the other will be

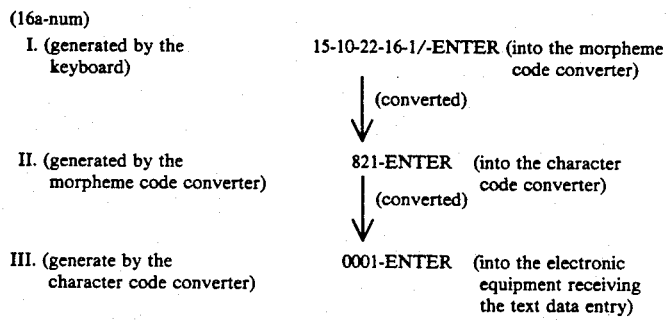

(16a-num)
I. (generated by the keyboard)    15-10-22-16-1/-ENTER (into the morpheme code converter)
↓ (converted)
II. (generated by the morpheme code converter)    821-ENTER (into the character code converter)
↓ (converted)
III. (generate by the character code converter)    0001-ENTER (into the electronic equipment receiving the text data entry)

In case the same block is encoded using the Chinese-style phonetic notation, the first signal string will be different but the others the same (16b-num)   I.   15-11-29-1/-ENTER

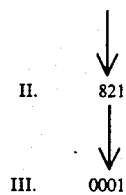

II.   821

III.   0001

The double-character Block 18 (Characters 0002 and 0003), which is also phonetically unique, would be encoded like this (18a-num)   I.   30-25-27-16-2/-20-25-4/-5-ENTER

II.   315-332

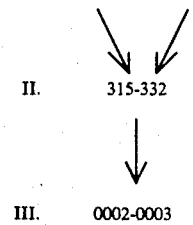

III.   0002-0003

If the phonetically not unique single-character Block 24 (Character 0002) is encoded with the help of Block 18 (just displayed) as a longer block, supposing that the one-signal-string way of conversion process is employed in the character code converter, the signals generated can be expressed like this (24a₁-num)   I.   30-25-27-16-2/-20-25-4/-5-ENTER

II.   315-332-5

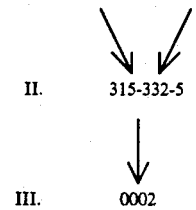

III.   0002

And if the same Block 24 is encoded with the help of Block 26 (Characters 0004 and 0002), as described earlier, the code structures of the signal strings will be (24a₂-num)   I.   19-27-3/-30-25-27-16-2/-6-ENTER

II.   175-315-6

↓

III.   0002

In all cases of encoding, such morpheme code conversions can be done in the same manner. The employment of this intermediate step can be illustrated by a comparison: it would be like a hypothetical operator with an exceptionally good memory, who could learn by heart all the 1280 morpheme code numbers assigned to the various speech morphemes in Mandarin Chinese and who would thus be able to enter on the keyboard, after inspecting or thinking of a character, not the individual speech sound and tone quality data, but directly the morpheme code number itself assigned to that character.

But whether the adoption of such an intermediate morpheme code conversion step is advisable depends on computer technological considerations and is left open here.

Optional Arrangements for the Special Function Keys

FIGS. 5a–5c show various possible arrangements of the space bar, the character position keys, the ENTER (delimiter) key and the (temporarily) STORE key, in addition to the preferred arrangement shown at the bottom of FIG. 1a. In FIG. 1a, the space bar 14 is also the ENTER key, and all the other keys mentioned above are between the space bar and the main body of the phonetic data keys.

In FIG. 5a the arrangement is simply the reverse of the preferred arrangement: the space bar is still the ENTER key, but all the other keys are placed, in one row, below the space bar.

In the arrangement in FIG. 5b, unlike those listed above, the space bar is not used when Chinese texts are encoded on the keyboard (or is used only as a conventional space bar). Here a separate ENTER key (or bar) 17 is provided, placed preferably at or near the center and between the first and the second character position key, as these two are the most often used ones. The row of the ENTER key, the character position keys and the STORE key is shown here below the space bar, but the position of this row and that of the space bar can be reversed.

Finally, in FIG. 5c the conventional space bar is broken up into a row of keys (or bars), preferably in the order as shown here. Except the key (or bar) at the left end 19, which is only a space bar, all the other keys in the row have here two functions, the function depending on what the keyboard is used for. When it is used to encode a Chinese text, they have the functions as marked on them at the left-hand side, otherwise (when, for example, an alphabetic text is entered) each of them *separately* is a space bar (in the drawing marked as SB) and any one of them can be struck at the convenience of the operator.

As all these keys (or bars) are most likely to be struck by the thumbs of the operator, their tops should preferably be wider (longer) than those of the keys struck by the other fingers.

The Alternative Embodiment: Speech Sound Analyzer

The embodiment of the invention considered so far has been that employing an electronic keyboard for entering the phonetic data. The other embodiment replaces this keyboard, at least a large section of the keyboard, by an electronic speech sound analyzer and recognition means (hereinafter briefly called "speech sound analyzer") working on acoustic principles. As viewed in the present invention, this can be a speech sound analyzer based on any of the technologies available in the field. What is sufficient for and required from the speech sound analyzer to be used for encoding Chinese texts according to the method here described, and therefore to fall within the scope of the invention, is that it generate a variety of sequentially coded electronic signal strings which are either (1) one by one corresponding to and indicative of the individual speech sounds and of the tone qualities of phonetic syllables of a given Chinese dialect (as are the signals resulting from keyboard actuations of the respective keys in the description above), or which are (2) one by one corresponding to and indicative of the different speech morphemes to be found in that dialect.

Figure 6B:
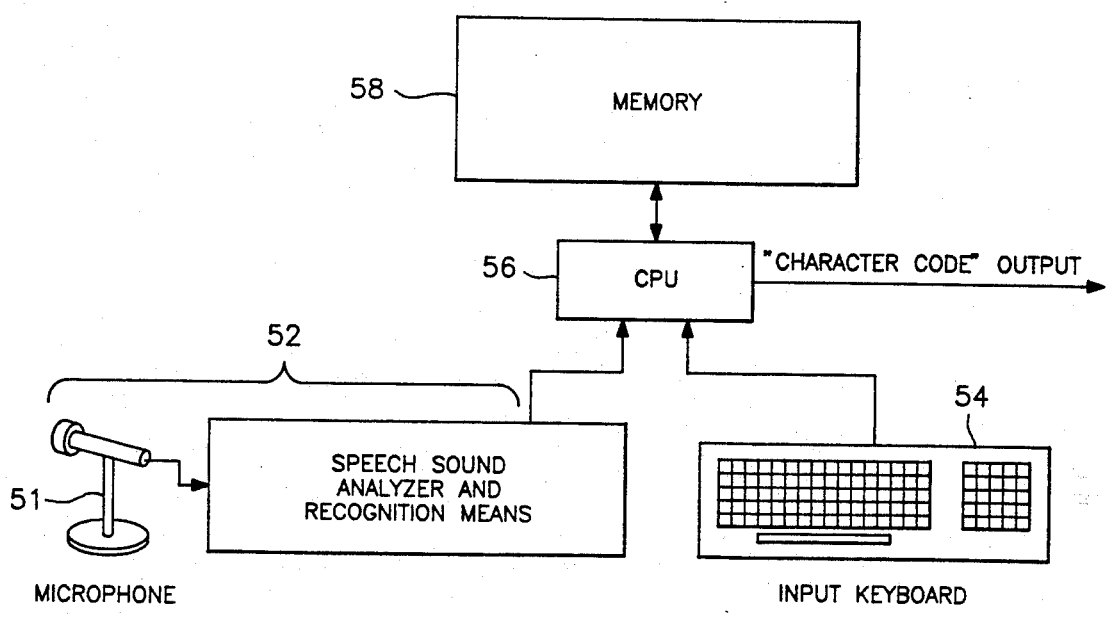

FIG. 6B is a block diagram of the function elements of the encoding and data entry means in the case in which a speech sound analyzer is used in addition to or instead of the input keyboard means to enter the speech sound (phonetic) data of the characters for the purpose of encoding. The speech sound data may be entered, in one possible arrangement, at the option of the operator, either by the speech sound analyzer and recognition means 52 or by the input keyboard means 54. In another arrangement, all the speech sound (phonetic) data are entered by the speech sound analyzer 52 and only the character position data and control signals are entered by he keyboard 54. The CPU 56 performs the same functions as described for the CPU 48 in FIG. 6A, i.e., it can process the signal strings generated by the keyboard and also those generated by the speech sound analyzer. The memory 58 performs also the same functions as the memory 50 in FIG. 6A.

Encoding by such a speech sound analyzer proceeds by the same basic rules given above, with the following differences. Whenever the data of a phonetic syllable are to be entered, instead of typing these data on keys, the operator reads the accurate pronunciation of the syllable into the analyzer. The sequence of the syllables to be read is that specified by the encoding rules. As to the delimiter signals between phonetic syllables, natural or deliberate gaps (silences) between the syllables, as they are pronounced in sequence, can cause the analyzer to generate such signals, or they ay be generated manually by the operator by the actuation of a special control key or similar device for this purpose. Those signals that are generated on the keyboard by the character position keys, which are essential in the present encoding method, can in this second embodiment also be generated by specific voice signals (for example, Chinese ordinal numbers read into the analyzer), or by a set of keys, similar to that on the keyboard, on which the operator manually enters the position data, after having read into the analyzer the pronunciation of a longer character block. Finally it seems that the ENTER signal and the STORE signal (if the latter is used) would most conveniently be generated manually on respective keys provided, though in principle even these can be generated by voice signals.

There can be numerous further variations made in the encoding method and equipment described above without departing from the basic principles and the proper scope of the invention, as set forth in the following claims.

We claim:

1. A keyboard for typing Roman alphabet transcriptions of Chinese character texts and for inputting phonetic data of said characters, based upon the pinyin phonetic notation system, comprising a plurality of keys actuable by an operator in a two-hand operation, including a row of keys on which said operator's fingers usually rest and a central area, said plurality of keys bearing respectively at least the letters of the Roman alphabet and four syllabic tone quality symbols used in the pinyin phonetic system, said keys being arranged such that:

keys bearing respectively the letters A, I, O and U are placed among different key groups, wherein each of said groups is struck by a different finger;

at least two of the seven keys bearing respectively the letters A, I, O, U, N, G and H are placed in the row of keys on which the operator's fingers usually rest;

at least two of the six keys bearing respectively the letters A, E, I, U, H and N are struck by the index finger or the middle finger of either hand; and four keys bearing said four syllabic tone quality symbols are placed in the central area of the keyboard such that either of the index fingers can actuate each of said four syllablic tone quality symbol keys.

2. The keyboard of claim 1, wherein at least four of said seven keys bearing respectively the letters A, I, O, U, N, G and H are placed in the row of keys on which the operator's fingers usually rest.

3. The keyboard of claim 2, wherein at least four of said six keys bearing respectively the letters A, E, I, U, H and N are so placed that each is among the keys usually struck by the index finger or the middle finger of either hand.

4. The keyboard of claim 3, wherein at least four of said seven keys bearing respectively the letters A, I, O, U, N, G and H are placed in the row of keys on which the operator's fingers usually rest.

5. The keyboard of claim 1, wherein all of said seven keys bearing the letters A, I, O, U, N, G and H are placed in the row on which the operator's fingers rest.

6. The keyboard of claim 1, wherein all of said seven keys bearing the letters A, E, I, U, H and N are placed in a position to be struck by the operator's index finger and middle finger of either hand.

7. A keyboard for typing Chinese language text using the pinyin phonetic notation system, wherein each Chinese character corresponds to one syllable, each syllable having an initial and final portion, said keyboard comprising:
- a first group of keys which are most frequently used to enter said initial portions,
- a second group of keys which are most frequently used to enter said final portions, and
- a third group of keys for selectively four syllabic tone quality symbols which identify an intonation pattern for a corresponding syllable, wherein said first group of keys is positioned to be struck by index fingers of a typist, and said second group of keys is positioned in a center row of the keyboard upon which the typist's fingers usually rest.

8. The keyboard of claim 7, wherein said first group includes keys bearing the letters H, T, W and X.

9. The keyboard of claim 7, wherein said second group includes keys bearing the letters A, I, O, U, N, H and G.

10. The keyboard of claim 7, wherein each key of said third group of keys is positioned to be actuated by either index finger of a typist.

11. The keyboard of claim 7, further comprising four character position keys positioned below said second group of keys.

* * * * *